United States Patent Office
3,597,386
Patented Aug. 3, 1971

3,597,386
FURFURYL ALCOHOL COMPOSITIONS
Leon de Brabander, Wilmington, Del., assignor to Haveg Industries, Inc., Wilmington, Del.
No Drawing. Filed Apr. 25, 1968, Ser. No. 724,230
Int. Cl. C08g 9/24
U.S. Cl. 260—37
23 Claims

ABSTRACT OF THE DISCLOSURE

The addition of a small amount of a mono-olefin polymer, preferably polypropylene, to a filled furfuryl alcohol resin containing a latent sulfonic acid salt catalyst dissolved in water reduces the amount of cracking of the product and improves the chemical resistance. Furthermore, the addition of a small amount of mono-olefin polymer to this mixture further improves the workability of the mixture and further improves the product. The preferred latent catalyst mixture contains ammonium benzene sulfonate and ammonium p-toluenesulfonate dissolved in water. With asbestos filler, a mono-olefin polymer addition also improves furfuryl alcohol resins containing dry catalysts.

---

The present invention relates to the preparation of filled furfuryl alcohol resins.

The use of furfuryl alcohol resins in molding compositions, of course, is well known. However, there are problems encountered with such compositions. Thus, the molded products frequently have cracking failures when subjected to heat cycling or after several months of service.

It is an object of the present invention to prepare novel filled furfuryl alcohol resins.

Another object is to reduce the cracking tendency of filled furfuryl alcohol resins.

An additional object is to improve the chemical resistance of filled furfuryl alcohol resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by adding a liquid catalyst system to a filled furfuryl alcohol resin.

It has also been found that these objects can be achieved to an even greater extent by adding a small amount of mono-olefin polymer having a softening point above 125° C., preferably 135° C., such as polypropylene, poly-3-methyl butene polymer or poly-4-methyl pentene and a liquid catalyst system to a filled furfuryl alcohol resin.

The preferred mono-olefin polymer is polypropylene and is employed in an amount by weight by not over 10%, preferably 1 to 5%, and most preferably 3 to 4%, of the total composition. The polypropylene is normally not over 14% by weight of the resin and is preferably between 5.5% and 7.5% by weight of the resin.

The filler can be wood flour, walnut shell flour, coconut flour, sawdust or redwood flour, but is preferably inorganic such as silica flour (Cab-O-Sil), coke flour, finely divided graphite or asbestos, e.g., anthophyllite asbestos and chrysotile asbestos with anthophyllite being the preferred asbestos when chemical resistance is desired. The filler is used in an amount of 30 to 70% by weight of the total composition. With asbestos filler, the mono-olefin polymer addition also improves furfuryl alcohol resins containing dry catalysts.

The furfuryl alcohol resin is either a homopolymer or a copolymer with up to 30%, e.g., 1 to 30%, of formaldehyde or furfural. The preferred resin is a furfuryl alcohol-formaldehyde copolymer containing 10 to 20% of formaldehyde. The furfuryl alcohol resin is present in an amount of 68.5 to 30% by weight of the total composition.

The liquid catalyst system is an aqueous solution of an amine or ammonium salt of an organic sulfonic acid, e.g., aliphatic and aromatic sulfonic acids. Typical examples of suitable salts are dimethyl amino benzene sulfonate, diethyl amino p-toluene sulfonate, ammonium benzene sulfonate, ammonium benzene disulfonate, ammonium phenol sulfonate, ammonium naphthalene sulfonate, ammonium anthracene sulfonate, ammonium sulfanilate, ammonium p-toluene sulfonate, ammonium m-toluene-sulfonate, ammonium o-toluene sulfonate, ammonium anthracene disulfonate, aniline salt of benzene sulfonic acid, aniline salt of p-toluene sulfonic acid, pyridine salt of phenol sulfonic acid. The preferred salts are ammonium salts. Most preferably a mixture of ammonium salts is employed, the preferred mixture being ammonium benzene sulfonate and ammonium p-toluene sulfonate. When a mixture of salts is employed, they are normally used in a 1:1 ratio, although they can be employed in ratios from 1:10 to 10:1. These catalysts are well known as latent catalysts for the conversion of a liquid initial furfuryl alcohol resin to the infusible, insoluble stage. Preferably, the mixture of catalysts have latent threshold temperatures at least 10° F. apart as disclosed in McWhorter Pat. 2,499,275. The amount of water present should be sufficient to dissolve the catalyst. The upper limit is not critical but obviously there is no advantage in adding large amounts of water which must then be removed by evaporation. The active catalyst (i.e., the sulfonic acid salts including the water) is most preferably used in an amount of 1% of the composition and can be from 0.25 to 10% of the composition, more preferably 0.5 to 3%. The key factor is that the catalyst be present in an amount sufficient to condense and cross-link the resin as is well known in the art.

When a dry catalyst is employed it can be any of the amine or ammonium salts of an organic sulfonic acid as set forth earlier, but omitting water. In addition there can be used organic sulfonyl chlorides e.g., p-toluene sulfonyl chloride or benzene sulfonyl chloride or any of the other catalysts or mixtures of catalysts set forth in McWhorter Pat. 2,499,275 column 6, line 60 to column 7, line 22 and in the table in column 7, lines 36–50.

For best results it is critical that the catalyst be employed in liquid form, i.e., in water solution. Thus, a conventional furfuryl alcohol-formaldehyde resin, graphite and a dry mixed catalyst system of ammonium benzene sulfonate, ammonium p-toluene sulfonate and p-toluene sulfonyl chloride had many problems with cracking failures. A similar composition but utilizing asbestos in place of the graphite likewise exhibited cracking failures in the case of heavy-walled or thick sections. The use of the liquid catalyst system solved many problems involved when graphite was utilized and the use of the combination of polypropylene and liquid catalyst when graphite was utilized showed even more improvement and completely solved the cracking problem.

When asbestos was used as a filler, the use of the liquid catalyst system solved many of the problems involved including solving the cracking problem. The use of the combination of polypropylene and the liquid catalyst when asbestos was utilized showed even more improvement in various properties but was not as pronounced as the improvement experienced with graphite filler when the combination polypropylene and liquid catalyst system was used instead of only the liquid catalyst system except that substantially higher compressive deformation and tensile elongation properties were obtained when polypropylene was employed.

In addition to the advantages noted previously, the liquid catalyst system of the present invention has the advantage that when it is mixed with the furfuryl alcohol resin the system is stable over a day. However, when a mixture of furfuryl alcohol resin is made with the prior art dry catalyst system, the system is not stable for as long as one day and fresh catalyst—furfuryl alcohol resin batches must be made daily.

To the liquid catalyst system of the present invention, there can be added p-toluene sulfonyl chloride or benzene sulfonyl chloride or even the free sulfonic acids, e.g., p-toluene sulfonic acid, but such additions are not essential.

The formulation prior to molding is preferably worked on a mandrel in conventional fashion as shown in Ward Pat. 2,835,107 FIGS. 7 and 8.

The use of the polypropylene and liquid catalyst system together not only eliminated the cracking problem but improved the chemical resistance and physical properties of the molded furfuryl alcohol resin.

Typical examples of suitable furfuryl alcohol resins are shown in Ward Pat. 2,835,107, McWhorter Pat. 2,499,274, McWhorter Pat. 2,471,438 and Lebach Pat. 2,471,631, but other commercially available thermosetting furfuryl alcohol resins can be employed.

In the specific examples below, finely divided particles of polypropylene were used. Unless otherwise indicated, all parts and percentages are by weight.

EXAMPLE 1

52.0 parts of furfuryl alcohol-formaldehyde resin were prepared in accordance with Example 2 of Ward Pat. 2,835,107 (the resin contained about 20% formaldehyde). 0.43 part of ammonium benzene sulfonate and 0.39 part of ammonium p-toluene sulfonate were dissolved in slightly more than the minimum amount of water, and the liquid catalyst system thus prepared was mixed with the resin. 47.18 parts of anthophyllite asbestos were added to this mixture. The mixture was then worked on a mandrel as shown in the Ward patent and molded to form a tank in conventional fashion. After molding, the tank was heat cured at a maximum temperature of 135° C. The tank was subjected to heat cycling tests of alternate 24 hour periods of heating to 135° C. and cooling to room temperature. No cracks were evidenced after ten cycles.

EXAMPLE 2

52.0 parts of furfuryl alcohol-formaldehyde resin was prepared in accordance with Example 2 of Ward Pat. 2,835,107 (the resin contained about 20% formaldehyde). 0.34 part of ammonium benzene sulfonate and 0.30 part of ammonium p-toluene sulfonate were dissolved in slightly more than the minimum amount of water, and the liquid catalyst system thus prepared was mixed with the resin. 0.18 part of dry p-toluene sulfonyl chloride was added to this mixture and then 47.18 parts of anthophyllite asbestos were added thereto. The mixture was then worked on a mandrel as shown in the Ward patent and molded to form a tank in convention fashion. After molding, the tank was subject to heat cure at a maximum temperature of 135° C. A tank of similar properties as in Example 1 was obtained.

EXAMPLE 3

46.32 parts of furfuryl alcohol-formaldehyde resin were prepared in accordance with Example 2 of Ward Pat. 2,835,107 (the resin contained about 20% formaldehyde). 0.48 part of ammonium benzene sulfonate and 0.40 part of ammonium p-toluene sulfonate were dissolved in slightly more than the minimum amount of water, and the liquid catalyst system thus prepared was mixed with the resin. 0.24 part of dry p-toluene sulfonyl chloride was added to this mixture. To this mixture 52.56 parts of graphite were added. The mixture was then worked on a mandrel as shown in the Ward patent and molded to form a tank in conventional fashion. After molding, the tank was subject to heat cure at a maximum temperature of 135° C. This tank did not have the quality that the tank in Examples 4 and 5 had and the deformation properties and tensile elongation properties were not as good as the tanks of Examples 4 and 5, but the properties were better than those obtained utilizing a completely dry catalyst system.

EXAMPLE 4

46.5 parts of furfuryl alcohol-formaldehyde resin were prepared in accordance with Example 2 of Ward Pat. 2,835,107 (the resin contained about 20% formaldehyde). 0.5 part of ammonium benzene sulfonate and 0.5 part of ammonium p-toluene sulfonate were dissolved in slightly more than the minimum amount of water, and the liquid catalyst system thus prepared was mixed with the resin. 3.5 parts of polypropylene (Profax 6401, density 0.90) were added to this mixture and then 49.0 parts of graphite were added thereto. The mixture was then worked on a mandrel as shown in the Ward patent and molded to form a tank in conventional fashion. After molding, the tank was heat cured at a maximum temperature of 135° C. The tank was subjected to heat cycling tests of alternate 24 hour periods of heating to 135° C. and cooling to room temperature. No cracks were evidenced after ten cycles and the tank had better deformation properties and higher tensile elongation properties than a similarly molded product which omitted the polypropylene.

EXAMPLE 5

46.32 parts of furfuryl alcohol-formaldehyde resin were prepared in accordance with Example 2 of Ward Pat. 2,835,107 (the resin contained about 20% formaldehyde). 0.48 part of ammonium benzene sulfonate and 0.40 part ammonium p-toluene sulfonate were dissolved in slightly more than the minimum amount of water, and the liquid catalyst system thus prepared was mixed with the resin. 0.24 part of dry p-toluene sulfonyl chloride was added to this mixture. To this mixture 3.5 parts of polypropylene (Profax 6401, density 0.90) were then added and then 49.06 parts of graphite were added thereto. The mixture was then worked on a mandrel as shown in the Ward patent and molded to form a tank in conventional fashion. After molding, the tank was subject to heat cure at a maximum temperature of 135° C. A tank of similar properties as in Example 4 was obtained.

EXAMPLE 6

The procedure of Example 4 was repeated but the graphite was replaced by anthophyllite asbestos. When a tank having a wall thickness of several inches was molded from the resin, no cracking occurred. The tank has better deformation properties and higher tensile elongation properties than the tank in Examples 1 and 2.

EXAMPLE 7

52.0 parts of furfuryl alcohol-formaldehyde resin were prepared in accordance with Example 2 of Ward Pat. 2,835,107 (the resin contained about 20% formaldehyde). 0.34 part of ammonium benzene sulfonate and 0.30 part of ammonium p-toluene sulfonate were dissolved in slightly more than the minimum amount of water, and the liquid catalyst system thus prepared was mixed with the resin. 0.18 part of dry p-toluene sulfonyl chloride was added to this mixture. To this mixture 3.0 parts of polypropylene (Profax 6401, density 0.90) were then added and then 44.18 parts of anthophyllite asbestos were added thereto. The mixture was then worked on a mandrel as shown in the Ward patent and molded to form a tank in conventional fashion. After molding, the tank was subject to heat cure at a maximum temperature of 135° C. A tank of similar properties as in Example 6 was obtained.

EXAMPLE 8

53.13 parts of furfuryl alcohol-formaldehyde resin were prepared in accordance with Example 2 of Ward Pat. 2,835,107 (the resin contained about 20% formaldehyde). 2.07 parts of dry mix (consisting of 1.25 parts acid washed anthophyllite asbestos, 0.34 part of ammonium benzene sulfonate, 0.31 part ammonium p-toluene sulfonate and 0.17 part of p-toluene sulfonyl chloride) were blended with 44.8 parts of asbestos filler and worked as in Example 1. The molded product was subjected to 135° C. Very severe cracking developed in less than one day.

EXAMPLE 9

Example 8 was repeated utilizing 50 parts furfuryl alcohol-formaldehyde, 2 parts of dry mix (consisting of 1.21 parts acid washed anthophyllite asbestos, 0.32 part of ammonium benzene sulfonate, 0.29 part ammonium p-toluene sulfonate and 0.18 part of p-toluene sulfonyl chloride) were blended with 5 parts polypropylene and 43 parts of asbestos filler. When the molded product was subjected to 135° C., fine hairline cracks developed after one day. Several very small cracks appeared after three days at this temperature.

When asbestos and liquid catalyst mixture of Example 1 were mixed with furfuryl alcohol-formaldehyde resin and the product molded, it had substantially the same compressive deformation and tensile elongation properties as a similar composition in which the same catalyst was employed but in anhydrous form.

What is claimed is:

1. A composition comprising a thermosetting furfuryl, alcohol resin selected from the group consisting of furfuryl alcohol homopolymers and copolymers with up to 30% of formaldehyde or furfural, a filler, latent sulfonic acid salt catalyst, sufficient water to dissolve the catalyst, said catalyst solution reducing cracking of articles molded from the composition, said salt being present in an amount sufficient to condense and crosslink the resin.

2. A composition according to claim 1 wherein the filler is an inorganic filler.

3. A composition according to claim 2 wherein the catalyst includes an ammonium salt of a sulfonic acid.

4. A composition according to claim 3 wherein the catalyst includes ammonium benzene sulfonate and ammonium toluene sulfonate.

5. A product prepared by molding the composition of claim 4.

6. A composition according to claim 4 wherein the composition contains about 30 to 70% filler, about 30 to 68.5% furfuryl alcohol resin, and about 0.25 to 10% of said catalyst.

7. A composition according to claim 1 further comprising a minor amount of mono-olefin polymer selected from the group consisting of polypropylene, poly-3-methyl butene polymer and poly-4-methyl pentene.

8. A composition according to claim 7 wherein the mono-olefin polymer is polypropylene.

9. A composition according to claim 8 wherein the composition contains about 30 to 70% filler, about 30 to 68.5% furfuryl alcohol resin, about 1 to 10% polypropylene and about 0.25 to 10% said catalyst.

10. A composition according to claim 9 wherein the furfuryl alcohol resin is a furfuryl alcohol-formaldehyde copolymer containing up to 30% formaldehyde and the filler is selected from the group consisting of graphite, coke, silica and asbestos.

11. A composition according to claim 10 wherein the polypropylene is not over 5% and said catalyst is not over 3%.

12. A composition according to claim 11 consisting of about 46.5% furfuryl alcohol-formaldehyde resin, 49% graphite or asbestos, 3.5% polypropylene and 1% of said catalyst on a dry basis.

13. A composition comprising a thermosetting furfuryl alcohol resin selected from the group consisting of furfuryl alcohol homopolymers and copolymers with up to 30% of formaldehyde or furfural, asbestos, latent sulfonic acid salt catalyst, sufficient water to dissolve the catalyst, said salt solution being present in an amount sufficient to reduce cracking of articles molded from the composition.

14. A composition according to claim 13 consisting essentially of about 30–70% asbestos, 30–68.5% furfuryl alcohol resin and about 0.25–10% of said catalyst.

15. A composition according to claim 14 wherein the asbestos is anthophyllite.

16. A composition comprising a thermosetting furfuryl alcohol resin selected from the group consisting of furfuryl alcohol homopolymers and copolymers with up to 30% of formaldehyde or furfural, filler, a latent catalyst for condensing and cross-linking furfuryl alcohol, and a minor amount of polypropylene.

17. A composition according to claim 16 wherein the latent catalyst is dry.

18. A composition according to claim 17 wherein the latent catalyst is a sulfonic acid salt.

19. A composition according to claim 16 wherein the latent catalyst is in solution in water.

20. A composition according to claim 13 wherein the latent catalyst is a sulfonic acid salt.

21. A composition according to claim 16 wherein the filler is asbestos.

22. A composition according to claim 1 further comprising polypropylene wherein the composition consists essentially of filler, 30 to 68.5% furfuryl alcohol resin, 1 to 10% polypropylene and 0.25 to 10% of said catalyst.

23. A composition according to claim 1 further comprising polypropylene wherein the composition consists essentially of filler, 30 to 68.5% furfuryl alcohol resin, 0.25 to 10% of said catalyst and polypropylene, said polypropylene being not over 14% by weight of the resin.

References Cited

UNITED STATES PATENTS 2,471,600   5/1949   Adams et al. _____ 260—37

OTHER REFERENCES

N. M. Bikales, ed., Encyclopedia of Polymer Science and Technology, vol. 7, John Wiley and Sons, Inc., New York (1967), pp. 436 and 437.

MORRIS LIEBMAN, Primary Examiner

S. M. PERSON, Assistant Examiner

U.S. Cl. X.R.

260—67, 829